(12) United States Patent
Krause

(10) Patent No.: US 6,684,727 B2
(45) Date of Patent: Feb. 3, 2004

(54) RACK AND PINION STEERING APPARATUS

(75) Inventor: Jeffery Krause, Lake Orion, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/952,802

(22) Filed: Sep. 14, 2001

(65) Prior Publication Data
US 2002/0005078 A1 Jan. 17, 2002

Related U.S. Application Data

(62) Division of application No. 09/343,856, filed on Jun. 30, 1999, now Pat. No. 6,293,164.

(51) Int. Cl.⁷ .............................. B62D 3/12; B62D 5/22
(52) U.S. Cl. ....................................... 74/422; 74/388 PS
(58) Field of Search ........................... 74/388 PS, 7 R, 74/7 A, 457, 422, 606 R; 180/148

(56) References Cited

U.S. PATENT DOCUMENTS

| | | | |
|---|---|---|---|
| 1,365,029 A | | 1/1921 | Fisher |
| 3,605,475 A | | 9/1971 | Eakin et al. |
| 3,813,909 A | | 6/1974 | Roger |
| 3,854,418 A | | 12/1974 | Bertin |
| 3,895,422 A | | 7/1975 | Graasfsma et al. |
| 4,524,631 A | * | 6/1985 | Cordiano ................ 74/388 PS |
| 4,574,648 A | | 3/1986 | Debello |
| 4,658,664 A | | 4/1987 | Jacobs et al. |
| 4,788,877 A | * | 12/1988 | Robinson et al. ....... 74/388 PS |
| 4,809,806 A | * | 3/1989 | Pietrzak et al. ...... 74/388 PS X |
| 5,070,957 A | * | 12/1991 | Harkrader et al. ... 74/388 PS X |
| 5,127,253 A | | 7/1992 | Takahara et al. |
| 5,272,930 A | | 12/1993 | Nakamura et al. |
| 5,408,857 A | | 4/1995 | Fuhrman et al. |
| 5,501,117 A | | 3/1996 | Mensing et al. |
| 5,730,018 A | | 3/1998 | Kobayashi et al. |
| 5,806,373 A | | 9/1998 | Parker |
| 6,035,957 A | * | 3/2000 | Place ................ 74/388 PS X |
| 6,053,060 A | | 4/2000 | Tumberlinson et al. |
| 6,209,409 B1 | * | 4/2001 | Kitahata et al. ........ 74/388 PS |

FOREIGN PATENT DOCUMENTS

| | | | |
|---|---|---|---|
| JP | 7-308729 | * | 11/1995 |
| JP | 7-310807 | * | 11/1995 |

* cited by examiner

Primary Examiner—Thomas R. Hannon
Assistant Examiner—Colby Hansen
(74) Attorney, Agent, or Firm—Tarolli, Sundheim, Covell & Tummino L.L.P.

(57) ABSTRACT

A method for forming a helical pinion gear (12) for a rack and pinion steering apparatus (10) comprises the steps of: providing a cylindrical first blank (60) made of a deformable material and having an outer surface (68); providing a cylindrical second blank (100) made of a deformable material and having an outer surface (108); forming a bore (116) extending at least partially through the second blank (100); forming helical teeth (52) on the outer surface (108) of the second blank; and interconnecting the second blank (100) with the first blank (60) to form the helical pinion (12). The helical teeth (52) on the pinion (12) mesh with rack teeth (44) on a rack (16) in a rack and pinion steering apparatus (10).

11 Claims, 2 Drawing Sheets

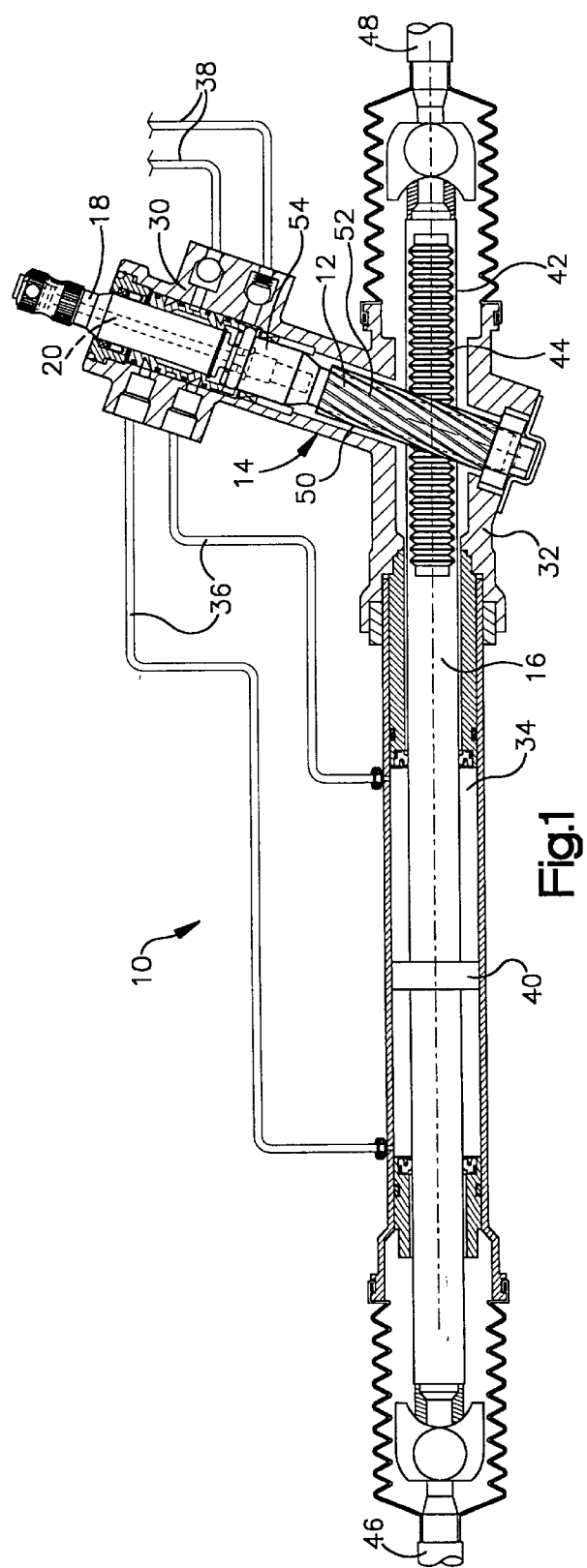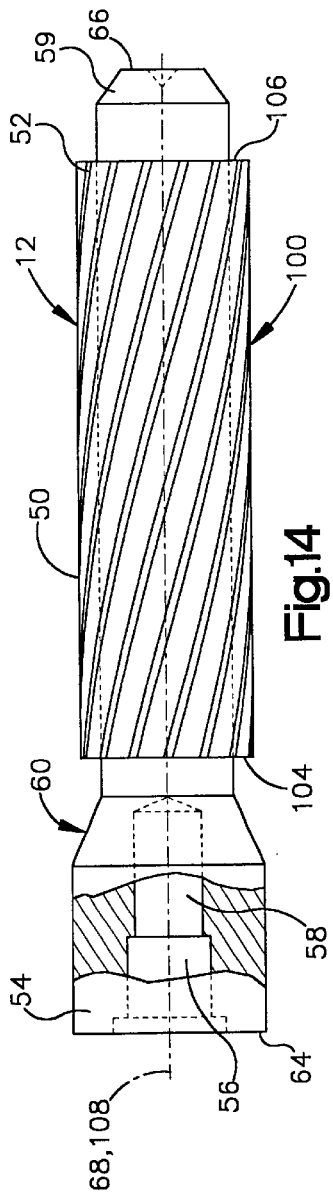

RACK AND PINION STEERING APPARATUS

RELATED APPLICATION

This application is a divisional of U.S. patent application Ser. No. 09/343,856, filed on Jun. 30, 1999 now U.S. Pat. No. 6,293,164.

TECHNICAL FIELD

The present invention relates to a rack and pinion steering apparatus and a method for manufacturing a pinion, and is particularly directed to a method for forming a two-piece helical pinion for a rack and pinion steering apparatus.

BACKGROUND OF THE INVENTION

A typical rack and pinion power steering apparatus for use in a power-assisted vehicle steering system includes a rack operatively coupled with steerable vehicle wheels and a pinion operatively coupled with a vehicle steering wheel. Teeth on the pinion are meshed with teeth on the rack such that rotation of the pinion produces linear movement of the rack which, in turn, causes the steerable wheels to turn laterally of the vehicle.

The teeth on the pinion can extend parallel to the central axis of the pinion, or can alternatively extend at an angle relative to the central axis in a pattern such as a helical pattern. It is desirable to have helical teeth on a pinion which extend at an angle of greater than 15° because a higher angle accommodates a greater range of potential vehicle applications and creates a smoother feel to the vehicle driver when turning the vehicle steering wheel.

It is known to manufacture a pinion, including the forming of teeth in a helical pattern on the outer surface of the pinion, using a machining process. The machining process produces a relatively large quantity of waste material. It is also known to manufacture a pinion having helical teeth using cold forming processes. One known cold forming process begins with a single piece of a metal material which is first extruded to form some of the features of the pinion teeth, and which is subsequently placed into a hobbing machine to cut the helical teeth in the material into their final form. This known process is not capable of efficiently mass producing pinions with a helical tooth angle over 15° because the large forces required to eject the helical pinions from the cold forming press destroys the tooling in the machine.

SUMMARY OF THE INVENTION

The present invention is a method for forming a helical pinion gear for a rack and pinion steering apparatus. The method comprises the steps of:

providing a cylindrical first blank made of a deformable material, the first blank having an outer surface and oppositely disposed first and second ends;

providing a cylindrical second blank made of a deformable material, the second blank having an outer surface and oppositely disposed first and second ends;

forming a bore extending at least partially through the second blank; forming helical teeth on the outer surface of the second blank; and interconnecting the first blank with the second blank to form the helical pinion.

The present invention also provides a rack and pinion steering apparatus for turning steering wheels of a vehicle upon rotation of a vehicle steering wheel. The rack and pinion steering apparatus comprises a housing having a chamber, and a rack linearly movable in opposite directions in the chamber to effect turning of the steerable vehicle wheels in opposite directions. The rack has an outer surface portion which includes rack teeth. A pinion is operatively coupled for rotation with the vehicle steering wheel. The pinion has an outer surface which includes pinion teeth extending in a helical pattern. The pinion teeth are meshed with the rack teeth to cause the rack to move linearly upon rotation of the pinion. The pinion comprises coaxially disposed first and second members fixedly attached to one another. Each of the first and second members has an inner surface and an outer surface. The inner surface of the second member engages the outer surface of the first member. The helical pinion teeth are formed on the second member.

BRIEF DESCRIPTION OF THE DRAWINGS

The foregoing and other features of the present invention will become apparent to those skilled in the art to which the present invention relates upon reading the following description with reference to the accompanying drawings, wherein:

FIG. 1 is a sectional view of a rack pinion steering apparatus having a helical pinion manufactured according to the method of the present invention;

FIG. 14 is a side view showing the first and second components which have been joined together to form the helical pinion.

DESCRIPTION OF PREFERRED EMBODIMENTS

Figure 2:
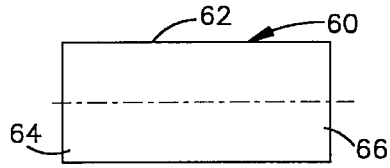
FIGS. 2–7 schematically illustrate a first component of the helical pinion of FIG. 1 during consecutive steps of manufacture.

The present invention relates to a rack and pinion steering apparatus and a method for manufacturing a pinion gear, and is particularly directed to a method for forming a two-piece helical pinion gear which may be advantageously used in a rack and pinion steering apparatus. The pinion gear described below could be used in either a manually driven steering apparatus or a power assisted steering apparatus. FIG. 1 illustrates a hydraulically assisted rack and pinion steering apparatus 10 having a pinion 12. The steering apparatus 10 further includes a housing 14, a rack 16, an input shaft 18, and a torsion bar 20.

The housing 14 has a hydraulic valve section 30 and a transversely extending rack section 32 through which the rack 16 extends. A rack chamber 34 is defined in the rack section 32 of the housing 14. Hydraulic lines 36 provide fluid communication between the rack chamber 34 and the valve section 30 of the housing 14. Hydraulic conduits 38 provide fluid communication between the valve section 30 and a power steering pump (not shown).

A piston 40 is connected to the rack 16 and is disposed in the rack chamber 34. The rack 16 includes a section 42 having rack teeth 44. The rack teeth 44 are meshed with helical teeth 52, described further below, on the pinion 12 inside the housing 14. Opposite ends of the rack 16 are connected with steerable vehicle wheels (not shown) by pivotable tie rods 46 and 48 as is known in the art.

The pinion 12 is located inside the housing 14 and has an outer surface 50. The outer surface 50 includes the teeth 52 which extend in a helical pattern. The torsion bar 20 is non-rotatably connected to a first end 54 (FIG. 14) of the pinion. The first end 54 of the pinion includes first and second recesses 56 and 58, respectively. The second recess 58 extends axially from the first recess 56 toward an oppositely disposed second end 59 of the pinion 12. The input shaft 18 is received in the first recess 56 and the torsion bar 20 is received in the second recess 58 in the pinion 12 as may be seen in FIG. 1.

The helical pinion 12 is manufactured using cold forming processes. The pinion 12 is made from two separate pieces of a deformable material which are cold formed separately, and subsequently joined together to form the final product shown in FIG. 14. According to a preferred embodiment of the present invention, first and second blanks 60 (FIG. 2) and 100 (FIG. 8), respectively, are cut from steel bar stock (not shown), preferably SAE 4140 coil stock. Alternatively, the blanks 60, 100 could be made of a powdered metal material, or a plastic material. The first and second blanks 60, 100 may be cut from the same bar stock or from different bar stocks. The first blank 60 is cut to a first length X1 (FIG. 2) to create a "preform" pinion blank.

Figure 3:
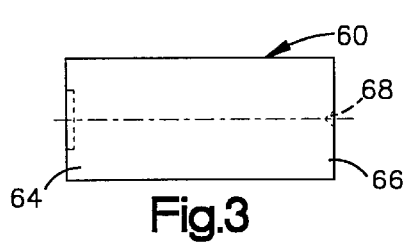
Figure 4:
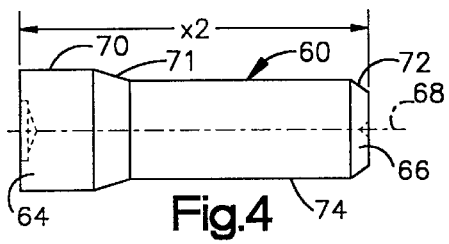

The first blank 60 has a cylindrical outer surface 62 and first and second ends 64 and 66, respectively. The first blank 60 is inserted into a cold heading machine. In the cold heading machine, the ends 64 and 66 of the first blank 60 are squared and the first blank is centered on a first axis 68 (see FIG. 3). The first blank 60 is placed into a die (not shown) having a desired interim shape for the first blank. The first end 64 of the first blank 60 is then upset, by pressing against the first end, to form a radially enlarged section 70 (FIG. 4) adjacent the first end. A first frustoconical surface 71 forms a portion of the radially enlarged section 70. In addition, a second frustoconical surface 72 is formed at the second end 66 of the first blank 60 during this step in the manufacturing process. A cylindrical shaft section 74 lies between the radially enlarged section 70 and the frustoconical surface 72 at the second end 66. The upsetting of the first blank 60 lengthens the first blank to a second length X2.

Figure 5:
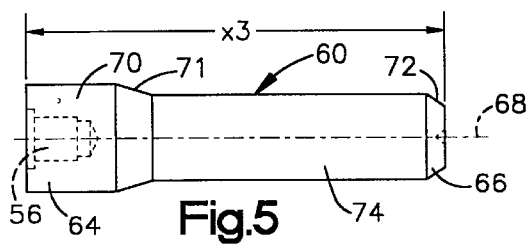

The next step in the manufacture of the helical pinion 12 is to forward extrude, by applying a press force to a punch (not shown) as is known in the art, the first recess 56 in the radially enlarged section 70 of the first blank 60 (see FIG. 5). The forward extruding process, which causes the first blank 60 to move into a female die (not shown) in the cold header in the same direction as the punch, lengthens the first blank to a third length X3.

Figure 6:
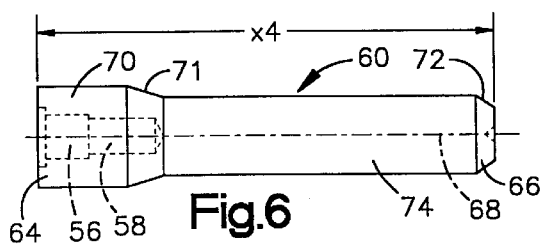
Figure 7:
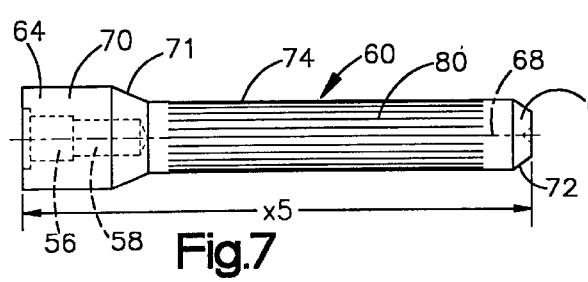

The second recess 58 in the radially enlarged section 70 of the first blank 60 is then formed by a second forwarding extruding step (see FIG. 6). This second forward extrusion, in which a punch is forced farther into the radially enlarged section 70, of the first blank 60 lengthens the first blank to a fourth length X4.

The first blank 60 is next subjected to another extrusion process in which the first blank is forced through a die (not shown) to form splines 80 on the outer surface 62 of the shaft section 74 of the first blank. The forming of the splines 80 further increases the length of the first blank 60 to a fifth and final length X5. Alternatively, it should be understood that a different drive connection feature than the splines 80, such as a D-flat or hexagonal shape, could be formed on the outer surface 62 of the first blank 60.

Figure 8:
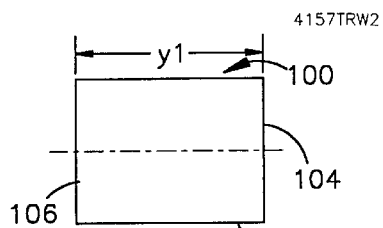
FIGS. 8–13 schematically illustrate a second component of the helical pinion of FIG. 1 during consecutive steps of manufacture.

The second blank 100, which was previously cut from steel bar stock, has a first length Y1 (FIG. 8). The second blank 100 has a cylindrical outer surface 102 and first and second ends 104 and 106, respectively. The second blank 100 is inserted into a cold heading machine to be used in cold forming of the second blank. The cold heading machine to be used in cold forming of the second blank 100 may be the same machine in which the first blank 60 was cold formed, or may be a different cold forming machine.

Figure 9:
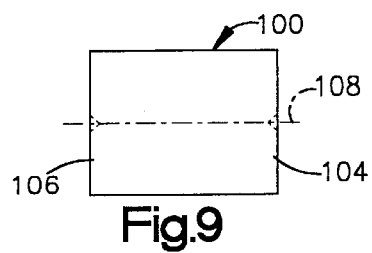
Figure 10:
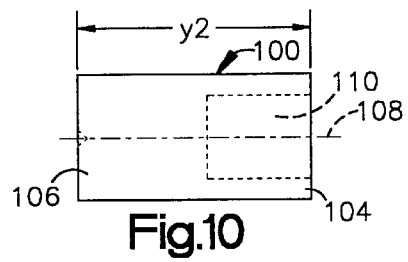

In the cold heading machine, the ends 104 and 106 of the second blank 100 are squared and the second blank is centered on a second axis 108 (FIG. 9). The first end 104 of the second blank 100 is then forward extruded, by applying a press force to a punch (not shown) as is known in the art, to form a first cavity 110 (FIG. 10) at the first end of the second blank. This extruding process, which causes the second blank 100 to move in the cold header in the same direction as the punch, lengthens the second blank to a second length Y2.

Figure 11:
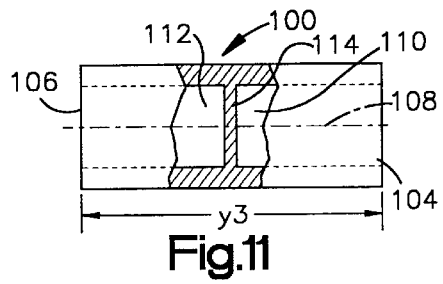

A second cavity 112 (FIG. 11) is next formed in the second blank 100 at the second end 106 of the second blank. The second cavity 112 has approximately the same diameter as the first cavity 110 in the second blank 100. The second cavity 112 is formed by a reverse or backward extrusion process in which the blank 100 is either stationary or travels against the movement of a punch (not shown) which creates the second cavity. The backward extrusion of the second blank 100 lengthens the second blank to a third length Y3 and leaves a dividing wall 114 in the second blank which separates the first and second cavities 110 and 112, respectively.

It should be understood that the order of the forward extruding step, which forms the first cavity 110, and the backward extruding step, which forms the second cavity 112, could be reversed.

Figure 12:
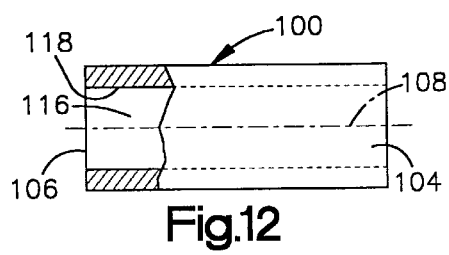

The dividing wall 114 in the second blank 100 is then pierced by a punch (not shown) to form a continuous opening or bore 116 (FIG. 12) through the second blank. The bore 116 is centered on the second axis 108 and is defined by a cylindrical inner surface 118. The dividing wall 114 which was removed from the second blank 100 represents the entire scrap material generated by the manufacture of the helical pinion 12. This quantity of scrap material is less than 10% of the total material used to manufacture the helical pinion 12. In addition, the bore 116 could be further extruded as required to mate with an alternative drive connection feature on the first blank 60.

Figure 13:
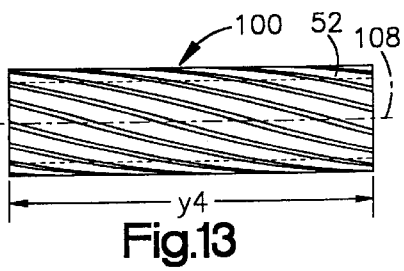

Next, a mandrel (not shown) is inserted into the bore 116 in the second blank 100 at the first end 104 of the second blank where the punch presses against the second blank. The second blank 100 is then forward extruded through a die (not shown) which forms helical teeth 52 into the outer surface 102 of the second blank and which lengthens the second blank to a fourth length Y4 (FIG. 13). In accordance with a preferred embodiment of the present invention, the helical teeth 52 are formed at a helical angle of at least 15°. It should be understood, however, that the disclosed process could be used to manufacture helical pinion gears having helical teeth formed at a helical angle of less than 15°. The mandrel rotates as the helical teeth 52 are formed into the second blank 100. The mandrel pushes the second blank 100, with its newly cut helical teeth 52, out of the cold header. In accordance with the preferred embodiment of the invention, a third blank (not shown), which follows the above-described second blank in the cold heading machine and which is being cold formed in the cold heading machine, pushes against the mandrel to cause the second blank to be expelled from the cold heading machine.

The first and second blanks 60 and 100, respectively, pressed together to form the helical pinion 12 (FIG. 14). The first axis 68 of the first blank 60 is aligned with the second axis 108 of the second blank 100, and the second blank is forced onto the first blank. The cylindrical inner surface 118 defining the bore 116 through the second blank 100 is pressed into engagement with the splined outer surface 62, or other alternative drive connection feature, on the shaft section 74 of the first blank 60.

The two-piece helical pinion 12 is then subjected to an induction hardening process to harden the helical teeth. The final step in the manufacture of the helical pinion 12 is to grind the surfaces of the helical pinion as needed to bring the surface dimensions within their respective tolerance limits.

The disclosed cold forming method for manufacturing of the helical pinion 12 provides an efficient and cost effective method for mass producing helical pinions with helical teeth 52 having an angle of greater than 15°. It should be understood that the above cold forming method for manufacturing of a helical pinion can also be used to manufacture helical pinions with helical angles of less than 15°. The method according to the present invention overcomes the problems in the prior art of ejecting a helical pinion having greater than 15° helical teeth from a cold forming machine, and thereby increases tool life. Further, the method described above results in a low quantity of scrap material being generated during the manufacturing process.

From the above description of the invention, those skilled in the art will perceive improvements, changes and modifications. For example, the order of the cold forming of the first and second blanks 60 and 100 could be switched so that the second blank is formed before the first blank. Alternatively, the first and second blanks 60 and 100 could be formed simultaneously in the same cold heading machine, or in different machines. Such improvements, changes and modifications within the skill of the art are intended to be covered by the appended claims.

Having described the invention, I claim:

1. A rack and pinion steering apparatus for turning steerable wheels of a vehicle upon rotation of a vehicle steering wheel, said rack and pinion steering apparatus comprising:
   a housing having a chamber;
   a rack linearly movable in opposite directions in said chamber to effect turning of the steerable vehicle wheels, said rack including rack teeth;
   a pinion operatively coupled for rotation with the vehicle steering wheel, said pinion including pinion teeth extending in a helical pattern, said pinion teeth being meshed with said rack teeth on said rack to cause said rack to move linearly upon rotation of said pinion,
   said pinion comprising coaxially disposed first and second members, said first member having a first outer surface and an end having a recess, said second member having a second outer surface and an inner surface,
   said inner surface of said second member defining a bore that receives said first member, said first outer surface of said first member interlocking with said inner surface of said second member to fixedly attach said first and second members together, said helical pinion teeth being formed on said second outer surface of said second member;
   an input shaft; and
   a torsion bar interconnecting said pinion with said input shaft, said recess of said first member of said pinion receiving a portion of said torsion bar.

2. The rack and pinion steering apparatus of claim 1 wherein said helical pinion teeth extend at a helical angle of at least 15°.

3. The rack and pinion steering apparatus of claim 1 wherein said first outer surface of said first member of said pinion includes splines, said first and second members being pressed together and deforming said splines.

4. The rack and pinion steering apparatus of claim 1 wherein said second member includes first and second axial ends, said first member being received in said first axial end of said second member and extending through said bore and outwardly of said second axial end of said second member.

5. A rack and pinion steering apparatus for turning steerable wheels of a vehicle upon rotation of a vehicle steering wheel, said rack and pinion steering apparatus comprising:
   a housing having a chamber;
   a rack linearly movable in opposite directions in said chamber to effect turning of the steerable vehicle wheels, said rack including rack teeth;
   a pinion operatively coupled for rotation with the vehicle steering wheel, said pinion including pinion teeth extending in a helical pattern, said pinion teeth being meshed with said rack teeth on said rack to cause said rack to move linearly upon rotation of said pinion,
   said pinion comprising coaxially disposed first and second members, said first and second members being metal, said first member comprising an end portion having a recess and a solid non-tubular portion that extends longitudinally from said end portion, said solid non-tubular portion of said first member having a first outer surface, said second member having a second outer surface and an inner surface,
   said inner surface of said second member defining a bore, said bore receiving said solid non-tubular portion of said first member such that said first member extends beyond opposite ends of said second member, said first outer surface of said first member interlocking with said inner surface of said second member to fixedly attach said first and second members together, said helical pinion teeth being formed on said second outer surface of said second member;
   a torsion bar received in said recess in said end portion of said first member.

6. A rack and pinion steering apparatus for turning steerable wheels of a vehicle upon rotation of a vehicle steering wheel, said rack and pinion steering apparatus comprising:
   a housing having a chamber;
   a rack linearly movable in opposite directions in said chamber to effect turning of the steerable vehicle wheels, said rack including rack teeth;
   a pinion operatively coupled for rotation with the vehicle steering wheel and including pinion teeth, said pinion teeth being meshed with said rack teeth on said rack to cause said rack to move linearly upon rotation of said pinion,
   said pinion comprising coaxially disposed first and second members, said first member having opposite first and second end sections, said first end section having a first outer surface with a first diameter and said second end section having a second outer surface with a second diameter that is less than the first diameter, said second member having a third outer surface and an inner surface,
   said inner surface of said second member defining a bore that receives said second end section of said first member, said second outer surface of said first member interlocking with said inner surface of said second member to fixedly attach said first and second members together, said pinion teeth being formed on said third outer surface of said second member, said first outer surface of said first end section of said first member being spaced away from said second member.

7. The rack and pinion steering apparatus of claim 6 wherein said third outer surface of said second member has a third diameter that is less than the first diameter of said first outer surface of said first end section of said first member.

8. The rack and pinion steering apparatus of claim 6 wherein said pinion teeth completely cover said third outer surface of said second member.

9. The rack and pinion steering apparatus of claim 6 wherein said first end section of said first member includes a first recess that is adapted to receive a portion of an input shaft.

10. The rack and pinion steering apparatus of claim 9 wherein said first end section of said first member includes a second recess that is adapted to receive a portion of a torsion bar.

11. The rack and pinion steering apparatus of claim 6 wherein the second outer surface of said first member of said pinion includes splines, said first and second members being pressed together and deforming said splines.

* * * * *